United States Patent
Anderson

[19]

[11] Patent Number: 5,993,341
[45] Date of Patent: *Nov. 30, 1999

[54] HYDRAULIC TENSIONER WITH A POSITION ACTUATED CHECK VALVE ASSEMBLY

[75] Inventor: David P. Anderson, Ithaca, N.Y.

[73] Assignee: Borg-Warner Automotive, Inc., Troy, Mich.

[*] Notice: This patent is subject to a terminal disclaimer.

[21] Appl. No.: 08/980,877

[22] Filed: Nov. 25, 1997

[51] Int. Cl.⁶ ....................................................... F16H 7/08
[52] U.S. Cl. ...................... 474/110; 474/111; 137/543.17
[58] Field of Search ...................... 474/110, 109, 474/111, 135, 136, 140, 46; 137/543.17, 540, 533.21, 533.31, 533.17; 473/310; 141/129

[56] References Cited

U.S. PATENT DOCUMENTS

| | | | |
|---|---|---|---|
| 568,362 | 9/1896 | MacSpadden et al. | 137/535 |
| 4,543,987 | 10/1985 | Ekeleme, Jr. et al. | 137/540 |
| 4,660,601 | 4/1987 | Dirksmeier, et al. | 137/613 |
| 4,678,123 | 7/1987 | Klaeger | 137/543.17 R X |
| 4,826,470 | 5/1989 | Breon et al. | 474/110 |
| 4,827,968 | 5/1989 | Brown | 137/270 |
| 4,940,447 | 7/1990 | Kawashima et al. | 474/110 |
| 4,963,121 | 10/1990 | Himura et al. | 474/110 |
| 5,177,861 | 1/1993 | Sawdon | 29/798 |
| 5,683,308 | 11/1997 | Monette | 473/310 |
| 5,700,213 | 12/1997 | Simpson et al. | 474/110 |
| 5,769,136 | 6/1998 | Kanematsu et al. | 141/129 |
| 5,819,794 | 10/1998 | Anderson | 137/543.17 |

Primary Examiner—Tamara L. Graysay
Assistant Examiner—Marcus Charles
Attorney, Agent, or Firm—Sidley & Austin; Greg Dziegielewski

[57] ABSTRACT

A hydraulic tensioner includes a check valve having a disc and stem, a slip mechanism, an anchoring piece, a stripper, and a disc seat. The check valve assembly is actuated from the position of a tensioner piston, so there is a high response.

16 Claims, 3 Drawing Sheets

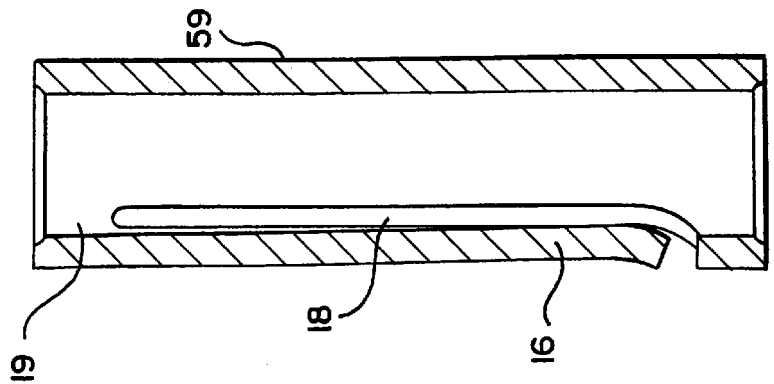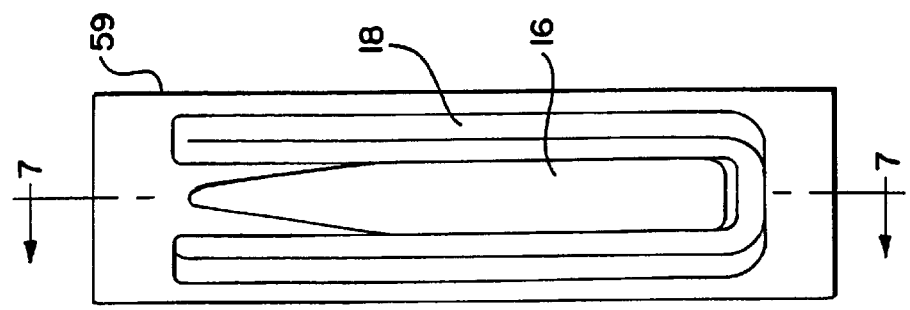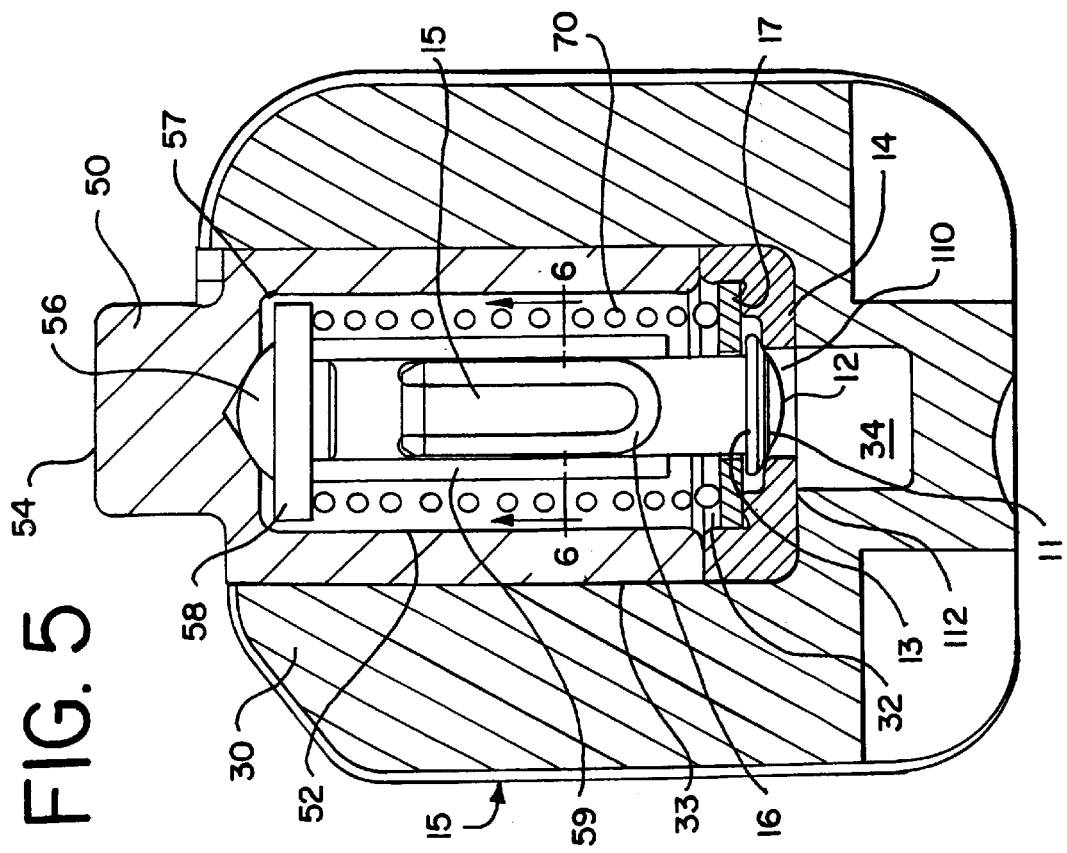

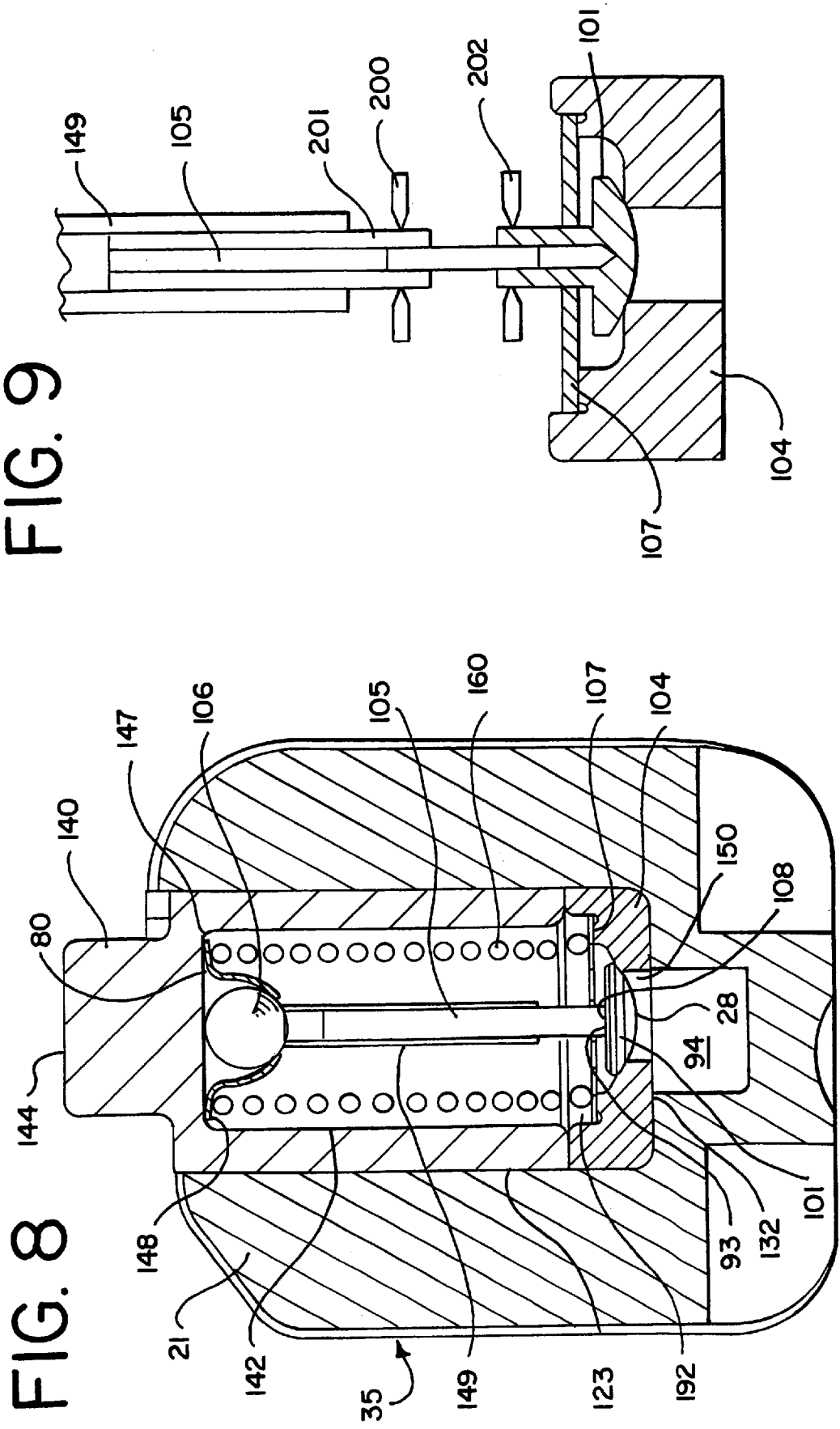

HYDRAULIC TENSIONER WITH A POSITION ACTUATED CHECK VALVE ASSEMBLY

BACKGROUND OF THE INVENTION

This invention relates to a hydraulic tensioner having a check valve assembly which is actuated by the position of a piston.

Hydraulic tensioners are typically used as a control device for a chain drive system in an automobile timing system. The tension in the chain can vary greatly due to the wide variation in the temperature and the linear thermal expansion among the various parts of the engine. Moreover, wear to the chain components during prolonged use can produce a decrease in the tension of the chain. A hydraulic tensioner is used to take up the slack in the chain or belt that connects the camshafts to the crankshaft of the engine timing system.

A typical hydraulic tensioner is comprised of a housing having a bore, a fluid chamber defined by the bore, and a hollow piston biased in a protruding direction from the bore by a spring. A check valve is also included in the hydraulic tensioner to permit fluid flow from a source of pressurized fluid into the fluid chamber, while preventing back flow in the reverse direction. The force of the chain against the piston in an inward direction is balanced by the resistance force of the fluid and force of the spring in an outward direction.

The check valve assembly is optimally designed to permit fast, instantaneous flow into the chamber and limited or no flow in the reverse direction. The response of the valve to changes in flow is constrained by the mass of the ball or disc, the size of the flow orifice, and the preload and spring rates of the check valve spring. During start-up, the piston spring forces the piston outward to create a vacuum condition in the chamber, which causes the check valve to open and permit flow into the chamber. Until the oil temperature rises to the high temperature level of normal operating conditions, the viscosity of the oil is high and flow through the check valve is slow. In such a condition, the oil cannot enter the chamber fast enough to match the expansion of the chamber from the rising piston. Thus, the chamber does not contain enough oil to properly damp the chain. This condition of low pressure in the chamber without sufficient fluid is known as cavitation and can be damaging to both the tensioner and chain.

In Kawashima et al., U.S. Pat. No. 4,940,447, the problem of cavitation is addressed by using a retainer mounted under the piston with a flat check plate. The plate is movable between two positions to open and close the channel or flow conduit into the chamber. The channel in the piston can be opened wide with a minimum stroke of the check plate to allow a large amount of oil to flow through the channel into the pressure chamber. Thus, cavitation is minimized by the quick response of the flat check plate valve.

In the present invention, in various embodiments, a check valve assembly is used to address the problems of: (i) cavitation associated with a ball check valve, (ii) tipping associated with standard flat disc type check valves, and (iii) concentricity associated with a contoured disc type check valve. A check valve assembly having a contoured disc as set forth in one embodiment of the invention provides a line type contact with the check valve seat, rather than a full surface type contact that would normally occur with a flat disc. The line contact and associated curvature allow for a less restrictive oil flow path between the disc and the seat.

Generally the performance of a check valve is constrained by the mass of the valve's moving components, the size of the flow orifice as the valve opens, and the spring preload and spring rate. The inlet orifice size of the valve of the present invention is large enough to allow a high flowrate of low temperature oil into the chamber so as to minimize the possibility of cavitation in the chamber.

SUMMARY OF THE INVENTION

The present invention is directed to a hydraulic tensioner with a position actuated check valve assembly, which is characterized as having high flow and high response conditions. The tensioner includes a housing with a central bore. A hollow piston is slidably received within the bore and creates a fluid chamber with the bore. The plunger, or piston, is biased in a protruding direction from the housing by a spring. A passage is provided in the housing to connect the chamber with a source of pressurized fluid.

A check valve assembly is provided between the chamber and the source of fluid to permit fluid flow into the chamber, while blocking flow in the reverse direction. In contrast to ball check valves known in the art, the check valve assembly of the instant invention is integral with the piston. The check valve assembly includes a check valve disc and stem, a slip mechanism, an anchoring piece, a travel control stripper, or travel restrictor, and a disc seat. The movement of the disc is controlled by the movement of the stem, which is connected to the pistons through the slip mechanism and travel restrictor.

The stem may be a flexible steel cable, steel rope, hollow or solid steel rod, or a thin wire. The stem may contact the disc with a soldered or brazed connection between the stem and the disc. The bottom convex portion of the disc contacts or closes the valve against the valve seat, while the upper surface of the disc includes a stem that is used to control the movement of the disc in relation to the movement of the piston. A ball may be substituted for the disc in this assembly, where the ball contacts the stem and operates similarly to the disc. A spring may also be included that contacts the ball and the valve seat. The slip mechanism may be an external coded tube, a tang or other means used to prevent slippage.

In addition, the check valve assembly has a large inlet orifice, as compared to a typical ball check valve. A typical ball check valve opens and closes in response to changes in the oil pressure. In contrast, the ball check valve of the present invention opens and closes in direct response to movement of the piston itself.

In the first embodiment of the present invention, the connection between the piston and the stem of the disc valve includes an anchoring piece that has a sleeve that contacts the inside of the upper end of the piston. The anchoring piece extends down toward the fluid chamber and the sleeve surrounds the stem. The slip mechanism, which acts to allow limited relative motion between the anchoring piece and the disc and stem, is compressed between the sleeve and the stem. The travel control stripper encloses the check valve assembly to restrict the upward movement of the disc when the disc contacts the stripper. In addition, the stripper guides the stem with a close tolerance.

Fluid is supplied by a reservoir and flows through the check valve into the pressurized chamber. In order to cause fluid to enter the chamber, a compression spring is used to bias the tensioner piston in an outward direction. The spring contacts the anchoring piece at the upper end of the piston to bias the piston in a protruding or outward direction from the bore. This moves the disc valve outward while, at the same time, producing a lower pressure in the chamber which permits flow through the valve into the chamber. As the chain slackens and tightens, the piston protrudes and withdraws in response to the vibration of the chain. The outward force of the spring and fluid on the piston resist or balance the inward force of the chain on the piston. Control over the opening and closing of the valve is accomplished by the direct connection between the piston and the disc valve.

In a second embodiment of the present invention, the anchoring piece sleeve includes a tang that connects the sleeve to the stem. The tang is formed from the sleeve and is deformed due to the fit between the stem and the sleeve. The tang acts as a spring when the stem is pushed up into the center of the sleeve because the amount by which the tang is bent provides an interference between the sleeve and the stem.

In a third embodiment of the present invention, the anchoring piece and stem are constructed of similar metals, one of which is provided with a pre-loaded force against the other to create a friction fit. The friction force is dependent upon the properties of the material used for the anchoring piece and the stem and the desired preload force, as well as the lubrication used. In addition, the stem may have a steel expansion clip within a groove on the stem or the stem may be a combination of flexible wire rope with a spring externally attached. This embodiment also includes a disc having a contoured surface with a socket contacting the stem. A ball contacts the stem at the opposite end of the socket. The ball and socket connections allow the disc to swivel relative to the stem, which moves in relation to the movement of the piston.

BRIEF DESCRIPTION OF THE DRAWINGS

FIG. 5 is a cross-sectional view of a second embodiment of the hydraulic tensioner of the present invention.

FIG. 6 is a sectional view of the sleeve of the hydraulic tensioner of FIG. 5 taken in along line 6—6.

FIG. 7 is a sectional view of the sleeve of FIG. 6 taken along line 7—7.

FIG. 8 is a cross-sectional view of a third embodiment of the hydraulic tensioner of the present invention.

FIG. 9 is a cross-sectional view of an alternative embodiment of the stem of the hydraulic tensioner of FIG. 8.

DETAILED DESCRIPTION OF THE PREFERRED EMBODIMENTS

Figure 1:
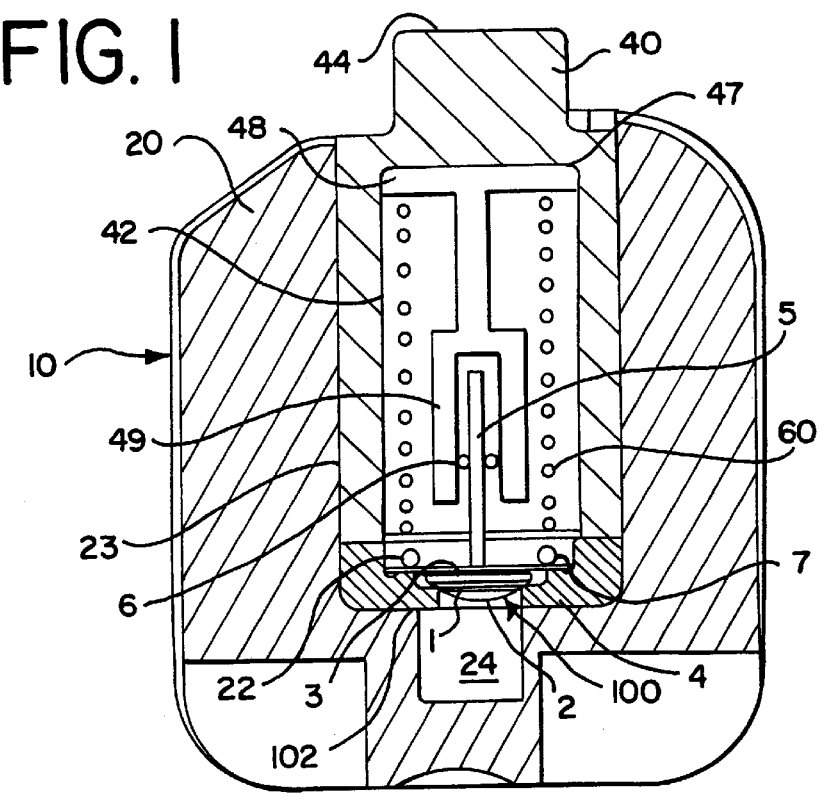
FIG. 1 is a cross-sectional view of a first embodiment of the hydraulic tensioner of the present invention.

FIG. 1 illustrates the hydraulic tensioner 10 incorporating the check valve assembly 100 of the present invention. The tensioner 10 includes a housing 20 having a bore 23 in its center, which is filled with fluid through a passageway 24 from a pressurized fluid source (not shown). The fluid source may be an oil pump or a reservoir. The housing receives a piston, or plunger, 40 in the bore 23. The hollow piston 40 forms a fluid chamber 22 with the bore 23. The piston 40 has an interior space 42 and an upper end 44. The upper end 44 contacts a lever or arm (not shown) to provide tension along a chain strand.

A check valve assembly 100 is provided between the chamber 22 and the passageway 24 to the source of pressurized fluid to permit fluid flow into the chamber 22, while blocking back flow in the reverse direction. The check valve assembly 100 includes a disc 1 having a contoured surface contacting a stem 5. The stem 5 may be a flexible steel cable, steel rope, hollow or solid steel rod, or a thin music wire. The stem 5 may contact the disc 1 by a solder or braze connection between the stem 5 and the disc 1. The disc 1 is slightly contoured at its top, but not at the top of valve 100. The disc 1 is preferably semicircular in shape with a bottom convex portion 2 of the curve facing outward toward the valve seat 4. The shape of the disc 1 enables the disc 1 to respond quickly to piston movement to provide different flowrates through the valve. The bottom portion 2 of the disc contacts or closes the valve 100 against a tapered valve seat 4. The upper surface 3 of the disc is in contact with stem 5 to control the movement of the disc 1 in relation to the movement of the piston 40. By using this type of configuration, concentricity of the disc 1 with respect to the valve seat 4 is maintained and tipping of the disc 1 relative to the valve seat 4 is prevented.

Figure 2:
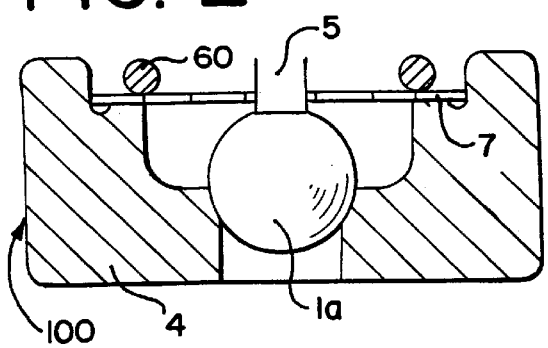
FIG. 2 is a cross-sectional view of an alternative embodiment of the check valve of the present inventor.
Figure 3:
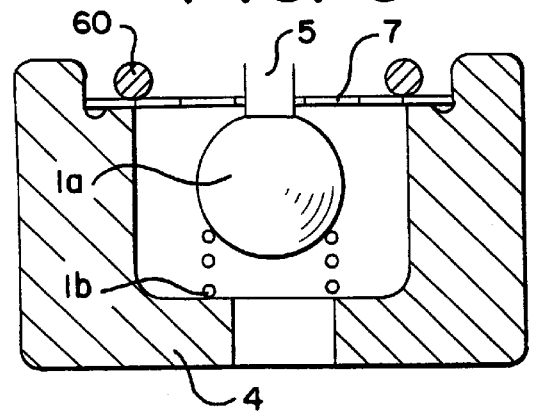
FIG. 3 is a cross-sectional view of a second alternative embodiment of the check valve of the present inventor.

As shown in the alternate embodiment of the check valve in FIG. 2, a ball 1a can replace the disc 1 in this embodiment. If the disc does not obtain an optimum seal initially, the delay or potential inappropriate seating will cause undesirable leakage past the disc. The replacement of the disc 1 with a ball 1a may allow a greater area of contact with the seat so that a precise and immediate seal is obtained between the ball 1a and the valve seat 4. A spring 1b may also be included with the ball to bias the ball in an outward direction from the valve seat 4, as shown in the second alternate embodiment in FIG. 3. When the check valve is open, the spring 1a allows a clearance between the ball 1a and the valve seat 4 for fluid to flow into the chamber.

An anchoring piece 48 having a sleeve 49 contacts the inside 47 of the upper end of the piston. The anchoring piece 48 extends down toward the fluid chamber 22, and the sleeve 49 surrounds a stem 5 with a slip mechanism 6 compressed between the sleeve 49 and the stem 5. In this embodiment, the slip mechanism 6 is a metallic O-ring that provides the force to keep the sleeve 49 in contact with the stem 5 by creating friction. The metallic O-ring can be formed by an extension spring curled in the shape of an "O". This friction allows a relative motion between the anchoring piece 48 and the stem 5 and allows a high range of motion of the piston 40, while maintaining a minimal range of motion of the stem 5 and disc 1. Upon the downward motion of the piston 40, the slip mechanism 6 translates force in the downward direction to close the valve 100. After the disc 1 and stem 5 contact the valve seat 4, the slip mechanism 6 is again employed to prevent excessive force of the disc 1 against the valve seat 4. Spring 60 contacts the anchoring piece 48 at the upper end 44 of the piston to bias the piston 40 in a protruding or outward direction from the bore 23. The anchoring piece 48 is always in contact with the piston 40, and the spring 60 provides the force to keep it in contact.

Figure 4:
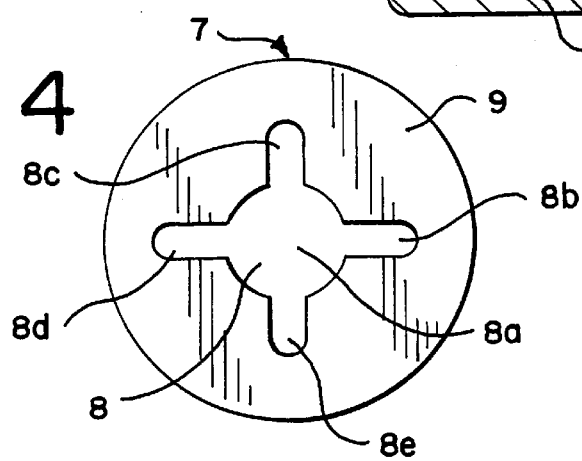
FIG. 4 is a top view of the travel control stripper of the hydraulic tensioner of FIG. 1.

A travel control stripper 7 encloses the check valve 100 assembly and contacts the spring 60. The stripper 7 restricts the upward movement of disc 1 when the disc 1 contacts the stripper 7. When the disc 1 strikes the travel control stripper 7, the slip mechanism 6 allows for relative motion between the anchoring piece 48 and the disc 1 over its stem 5. In addition, the stripper 7 guides the stem 5 with a close tolerance. As shown in FIG. 4, the stripper 7 is a solid circular piece 9 with an opening 8 having a middle portion 8a in the shape of a circle and four cylindrical portions 8b, 8c, 8d, and 8e extending beyond and intersecting within the middle portion 8a.

During start-up of the hydraulic chain tensioner 10 at normal operating conditions, the oil pressure is increasing. The force from the spring 60 causes the piston 40 to move and thus, creates a pressure differential. The upward movement of the piston 40 opens the check valve 100 since the check valve is integral to the piston and allows positive fluid flow into the chamber 22. The force resulting from the upward movement of the piston is translated through the slip mechanism to the stem and disc. Fluid enters through check valve 100 and passageway 24 and fills up the chamber 22. As the chamber 22 fills with fluid, the piston 40 moves outward from the chamber 22 due to the force of the spring 60 and the pressure of the fluid supplied by the external source. As the chamber 22 fills, the check valve 100 prevents back flow out of the chamber 22. During operation, the force of the chain against the piston 40 is balanced by the force of the spring 60 and the pressurized fluid in the chamber 22. The disc 1 will quickly respond to the movement of the piston to open and close the check valve 100.

When the hydraulic chain tensioner 10 is started in a low temperature environment, the fluid will be highly viscous and will flow very slowly from the reservoir into the chamber 22. Therefore, high flow is required through the check valve 100. A typical ball check valve has a limited orifice size, so it cannot provide a sufficiently high flow rate to prevent cavitation. The disc type check valve 100 has a low mass and high flow due to a large inlet orifice, in contrast to a conventional ball check valve. The check valve 100 will respond quickly and provide sufficient flow to minimize the effect of cavitation. The configuration of the present invention provides for simple calibration.

In a second embodiment of the present invention, as shown in FIG. 5, the tensioner 15 includes a housing 30 having a bore 33 in its center, which is filled with fluid through a passageway 34, and a fluid chamber 32. The piston 50 has an interior space 52 and an upper end 54. A check valve 110 is provided between the chamber 32 and the passageway 34. The check valve 110 includes a disc 11 having an upper surface 13 and a bottom surface 12, a stem 15, and a tapered valve seat 14. A travel control stripper 17 encloses the check valve 110 assembly and contacts a spring 70.

An anchoring piece 58 has a sleeve 59 and a rounded top piece 56, which contacts the inside 57 of the upper end of the piston. A spring 70 contacts and biases the anchoring piece 58 toward the upper end 54 of the piston. In this embodiment, the disc stem is friction fit against a tang that extends inward from the sleeve. The tang is a rectangular piece that is cut out from the sleeve on three sides and then bent inward on the fourth side. The sleeve 59 surrounds a stem 15 with tang 16 connecting the sleeve 59 to the stem 15. The tang 16 is formed from the sleeve 59 and is deformed due to the fit between the stem 15 and the sleeve 59. The tang 16 is designed similar to a cantilevered flat spring with specific pre-load and spring rates to provide an optimum friction force for the slip. This friction allows a relative motion between the anchoring piece 58 and the stem 15 and allows high range of motion of the piston 50, while maintaining a minimal range of motion of the stem 15 and disc 11. Upon downward motion of the piston 50, the tang 16 translates force in the downward direction to close the valve 110. After the disc 11 and stem 15 contact the valve seat 14, the tang 16 is again employed to prevent excessive force of the disc 11 against the valve seat 14.

As shown in FIG. 6, the tang 16 is integrally formed from the sleeve 59. The sleeve 59 is formed by pre-cutting a piece of flat metal into a desired shape, which in this case is rectangular. Section 7—7 of the sleeve 59 in FIG. 6 is shown in FIG. 7, where the tang 16 is bent inward toward the center of the sleeve. The tang portion 16 of the sleeve 59 is formed by cutting out a u-shaped section 18 in the sleeve 59. This forms the three cut-out sides of the rectangular tang. The cut-out section 18 serves as a clearance for the bending of the fourth, non-cutout side of the tang 16 of the sleeve 59. The tang 16 and sleeve 59 are formed by curling a metal sheet around a mandrel. At this point, the tang 16 is parallel with the rest of the sleeve 59, but has a clearance, or cut-out section 18, around it, except at the tang connection 19, where the tang 16 is connected to the sleeve 59. The tang 16 is bent inward into the clearance 18 so that the tang 16 is no longer parallel to the original cylinder of the sleeve 59. The tang 16 acts as a spring when the stem 15 is pushed up into the center of the sleeve 59 because the amount by which the tang 16 is bent provides an interference between the sleeve 59 and the stem 15.

In the third embodiment of the present invention, as shown in FIG. 8, the tensioner 35 includes a housing 21 having a bore 123 in its center, which is filled with fluid through a passageway 94, and a fluid chamber 92. The piston 140 has an interior space 142 and an upper end 144. A check valve 150 is provided between the chamber 92 and the passageway 94. The check valve 150 includes a disc 101 having a contoured surface with a socket 108 contacting a stem 105. At the opposite end of socket, a ball 106 contacts the stem 105. The bottom surface 28 of the disc contacts or closes the valve 150 against a tapered valve seat 104. The ball and socket connections allow the disc 101 to swivel relative to the stem 105, which moves in relation to the movement of the piston 140, and take up any misalignment. The ball and socket connections prevent a delay or potential inappropriate seating of the disc 101 that may result in leakage past the disc 101. A travel control stripper 107 encloses the check valve 150 assembly and contact the spring 160.

An anchoring piece 148 has a top portion 80, which surrounds the ball 106, and a sleeve 149. The ends of the top portion 80 contact the inside 147 of the upper end of the piston. A spring 160 contacts the anchoring piece 148 at the upper end 144 of the piston. The anchoring piece 148 extends down toward the fluid chamber 92 and the sleeve 149 surrounds a stem 105. The anchoring piece 148 and the stem 105 are made of similar metals, one of which is pre-loaded against the other like a spring, to create friction. The friction force is dependent upon the properties of the material used for the anchoring piece 148 and the stem 105, as well as the lubrication used. The lubrication will most likely be motor oil.

In addition, as shown in FIG. 9, the stem 105 may have a steel expansion clip within a groove on the stem 105, or the stem 105 may be a flexible thin wire or steel rope attached to a spring pin 201 with a pair of crimps 200. The spring pin 201 can be either a spiral or standard roll pin. In this case, the spring pin 201 expands within the anchoring piece 148 to provide an expansion force and the stem 105 and disc 101 are held together with a pair of crimps 202.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:
   a housing having a bore, said bore defining a fluid chamber;
   a hollow piston slidably received within the bore, said piston having an upper end;
   a first spring biasing the piston in a protruding direction from said bore;
   a passage in the housing to connect the chamber with a source of pressurized fluid; and
   a check valve provided in the passage between the chamber and a source of pressurized fluid to permit fluid flow into the chamber while blocking flow in the reverse direction, said valve including a seat and a translatable valve member, said valve member formed of a contoured disc and a stem, said stem being operatively connected to said piston.

2. The hydraulic tensioner of claim 1 wherein said check valve further comprises:
   an anchoring piece contacting the upper end of said piston, said anchoring piece having a sleeve extending down toward said chamber;
   a slip mechanism located between said sleeve and said stem; and
   a travel control member surrounding said disc, said travel control member limiting the upward movement of said disc.

3. The hydraulic tensioner of claim 2 wherein said slip mechanism is a coiled tube.

4. The hydraulic tensioner of claim 2 wherein said slip mechanism is a tang member bent inward from said sleeve.

5. The hydraulic tensioner of claim 2 wherein said stem is a flexible cable.

6. The hydraulic tensioner of claim 2 wherein said stem is a thin, flexible wire.

7. The hydraulic tensioner of claim 6 further comprising:
   a spring pin, said spring pin being attached to said flexible wire and contained within said anchor piece; and
   a plurality of crimps, said crimps securing said spring pin to said flexible wire and said flexible wire to said disc.

8. The hydraulic tensioner of claim 2 wherein said stem is a solid steel rod.

9. The hydraulic tensioner of claim 2 wherein said stem is a hollow steel rod.

10. The hydraulic tensioner of claim 1 wherein said stem has a groove, said groove containing a steel expansion clip.

11. The hydraulic tensioner of claim 1 wherein the contoured disc is semicircular in shape.

12. The hydraulic tensioner of claim 11 wherein said disc and stem are attached by a soldered connection.

13. The hydraulic tensioner of claim 11 wherein said disc and stem are attached by a brazed connection.

14. The hydraulic tensioner of claim 11 wherein said semicircular disc is biased downward against said check valve seat.

15. The hydraulic tensioner of claim 14 wherein said stem to disc connection includes a ball and socket joint, said ball and socket joint being at opposite ends of the stem.

16. The hydraulic tensioner of claim 15 wherein said ball and socket joint are biased by a spring.

* * * * *